United States Patent [19]

Frey et al.

[11] Patent Number: 5,305,390
[45] Date of Patent: Apr. 19, 1994

[54] PERSON AND OBJECT RECOGNITION SYSTEM

[75] Inventors: Ronald G. Frey, Hackensack; Thomas C. Guthrie, Mendham, both of N.J.

[73] Assignee: Datatec Industries Inc., Fairfield, N.J.

[21] Appl. No.: 855,503

[22] Filed: Mar. 20, 1992

Related U.S. Application Data

[63] Continuation-in-part of Ser. No. 640,272, Jan. 11, 1991, Pat. No. 5,138,638.

[51] Int. Cl.[5] .............................................. G06K 9/00
[52] U.S. Cl. .................................... 382/2; 340/545; 340/556; 250/221; 377/6; 377/53
[58] Field of Search ...................... 382/2, 65; 340/556, 340/552, 545, 555; 377/6, 53; 250/221

[56] References Cited

U.S. PATENT DOCUMENTS

| | | | |
|---|---|---|---|
| 4,021,644 | 5/1977 | Dreslinski | 377/6 |
| 4,278,878 | 7/1981 | Kato | 377/6 |
| 4,356,387 | 1/1982 | Tsubota et al. | 377/6 |
| 4,700,295 | 10/1987 | Katsof et al. | 377/6 |
| 4,719,363 | 1/1988 | Gallacher | 340/556 |
| 4,868,901 | 9/1989 | Kniskern et al. | 377/6 |
| 4,949,074 | 8/1990 | D'Ambrosia et al. | 340/552 |
| 4,993,049 | 2/1991 | Cupps | 377/6 |
| 5,138,638 | 8/1992 | Frey | 340/556 |

Primary Examiner—Joseph Mancuso
Attorney, Agent, or Firm—Rogers, Howell & Haferkamp

[57] ABSTRACT

A system for automatically recognizing persons or objects as they move past a selected location and for classifying the persons or objects in accordance with selected criteria. The system includes emitters for emitting beams toward a person or object moving past a selected location to generate reflected beams from the person or object. The included angle of the emitted and reflected beam is a function of the height of the person or object. A detector detects the reflected beams and generates signals representative of the included angle, and thus representative of a time-dependent height profile of the person or object from which the beams are reflected. The person or object is classified according to selected criteria.

32 Claims, 8 Drawing Sheets

PERSON AND OBJECT RECOGNITION SYSTEM

"The application is a continuation-in-part of U.S. patent application Ser. No. 07/640,272 filed Jan. 11, 1991, entitled System For Determining The Number Of Shoppers In A Retail Store And For Processing That Information To Produce Data For Store Management", now pending.

BACKGROUND AND SUMMARY OF THE INVENTION

This invention is generally directed to a system for recognizing people or objects, and has many applications as will be explained.

In accordance with one such application, the present invention is directed to determining the number of shopper units in a retail store, and the people that comprise those shopper units. By "shopper units" is meant those persons who are potential customers, i.e., may be expected to make purchases in the store. For example, it is not uncommon for a parent to shop with young children. The parent and children as a group would constitute a single shopper unit because the young children themselves would not be expected to make a purchase.

Knowing the number of shopper units in a store, in contrast to the number of people in the store, is valuable store management information. With selected criteria, such as height categories, the system of the present invention can count the persons as they enter and leave a store location, such as a doorway, measure the heights of the persons, and using selective criteria generate data for use in store management. For example, such data may include the number of shopper units in the store at selected time intervals. Also, using height criteria, the system will discriminate between persons and objects such as shopping carts or the like. For example, the system can be programmed to detect a shopping cart by measuring the height of the cart and recognizing the length of time that the system detects that height as the cart moves past the system detector. The system will also detect the direction of movement of the person along the person's path of travel at the store location, e.g., whether the person is entering or leaving the store. Hence, the system can determine the number of persons or shopper units in the store at any given time.

Systems or devices for counting people as they move past a location are known. Tsubota Patent No. 4,356,387 discloses a counting system for counting persons of a minimum height using a radiant energy emitter and a radiant energy receiver. The radiant energy is infrared. The system screens height by prefocusing the emitter and setting the emitter and detector angle so that the two intersect at some point in space in the portal. This permits screening out objects or persons shorter than the point of intersection to allow the counting of only those objects or persons that are above the selected height. However, it does not count or give height information on objects or persons below the selected threshold. Another problem with the device of the Tsubota patent is that each installation must be precisely aligned and carefully aimed so that the point of intersection of the emitter beam with the reception path of the receiver is at the desired minimum height above the floor.

Zepke Patent No. 4,799,243 discloses a person counting device by detecting the presence of thermal radiation from the body. It includes an infrared detector but no emitter. When a living object passes through a portal, it radiates infrared energy that is detected by the device, the device thereby detecting the presence of a person walking through the portal. The device of Zepke does not discriminate by or measure height.

Mizukami Patent No. 4,733,081 is directed to an apparatus for sensing a body by detecting the difference between the reflected amount of infrared rays directed to the body as against the background.

Shahbaz Patent No. 4,528,679 is directed to an automatic counting systems for passengers. The device is primarily for counting passengers entering or leaving a common carrier such a bus. The device comprises stations located at the steps of the bus where the stations include ultrasonic transducers. Ranging circuits each include a transmitting circuit for generating a pulse to be transmitted by each associated transducer, and receiving circuit for receiving and detecting the echo signal received through the transducer. A pulse count is generated that is directly proportional to the distance from the transducer to the object from which the echo has returned. The logic circuit operates to determine the presence or absence of a passenger under each station on the basis of a range distance measurement of less than a predetermined distance corresponding to the presence of a passenger of a height greater than a predetermined height. Hence, the system detects the number of passengers over a preselected height, but ignores all persons below the threshold height level.

Koelsch Patent No. 4,847,485 discloses an arrangement for determining the number of persons within a space using infrared sensors. The system does not include emitters or any means for determining the heights of the persons, or using that information to provide management data.

So while systems or devices for counting people or for counting people over a selected height were known, none of these systems provide the necessary height measurement for all persons passing through a selected location, and for using that information to generate data for use, such as by retail store managers, to evaluate store performance and the like. For example, such information may include the number of shopper units in the store during selected time intervals and the composition of the shopper units, i.e. adults and children. Knowing the number of children and adults in each shopper unit is useful to store management in evaluating and improving store performance.

The present invention is particularly directed to use in retail stores for generating information on the number of persons in the store at selected time intervals, the categories of those persons, and the way in which those categories relate to actual store performance. Obviously, the primary objective of any retail establishment is to maximize sales. This includes converting shoppers to actual customers. In other words, the objectives are to attract persons to the store, and once in the store convert them to customers. Hence, the shopper-to-customer "conversion rate" is the percentage of shoppers that actually make purchases.

For an accurate measure of conversion rate it is not enough to merely count persons as they enter and leave the store. This is because not all persons who enter the store are potential customers. As mentioned previously, many such persons may be young children who are unlikely to make any purchases themselves. Hence, it is important to distinguish between persons who are potential customers, and those that are not. This may be done using height criteria. The system of the present invention not only counts persons as they enter and leave a selected location, but also "measures" the heights of the persons or objects, generating height profiles of the persons or objects, and converts that information to the number of shopper units using height criteria.

Although it is important to identify the number of persons who are potential customers, it is also important to know the number of such persons who are not. Such information is useful for a wide variety of store evaluation purposes.

The system of the present invention performs its functions without interfering in any way with the store traffic, and without requiring any involvement of store personnel. It operates fully automatically without the shoppers even knowing of its existence. It generates highly reliable count information of in and out shopper flow. The optics module device may be mounted overhead such as above a doorway where the customers enter and leave the store. On wide doorways multiple optics modules may be used at selected spaced intervals to insure that all shoppers entering and leaving the store are detected. The information from the optics module is communicated to a central processing unit (CPU) which interprets the data from the optics module, such as determining the height category of the person and whether the person is entering or leaving the store. The data, in turn, may be transmitted to the store controller or in-store processor (ISP). Data from the system of the present invention is integrated with data from the store's point of sale (POS) system and other store computer management systems which provide number of sales (customers), dollar sales, times of sales, locations of sales, sales categories, labor hours, and so on. From this combined information numerous management reports may be generated to assist management in evaluating store performance. Using this information store management can identify problem areas and take corrective measures to improve store performance. Realistic performance goals can be established for each store taking into account the number of shopper units available to the store. The information may also be used to optimize staffing for greater service, increase conversion rates, and improve dollar volume per transaction.

From data generated from the system of this invention together with data from other store systems including the POS system, advertising and special event effectiveness may be evaluated. Controlled tests can be conducted in paired media markets to accurately measure the increased traffic created by individual ads, multimedia campaigns, sales events, or specific promotions. For example, it can be determined whether the advertising or special events delivered increased shopper units, and whether such increase in shopper units resulted in the expected increased sales. The system may be used to measure the impact of competitors' advertising on a store's performance, and data from the system may be used to assist in evaluating the impact of the store's appearance, layout, and merchandise presentation. Data from the system may be used in determining the effectiveness of in-store promotions as well as merchandise placement within the store. From this, the store management may determine whether the store is merchandising effectively or if a new department or service is generating interest. The optics module may be placed in sensitive areas of the store, such as the cash office, stockroom, or the like, to monitor traffic in those areas, alerting the management to unusual patterns of activity.

Most importantly, the system of the present invention when used with other store systems, such as the POS system, provides great versatility in generating information to increase store sales.

The invention of the present application has many other applications of which the following are examples.

The invention may be mounted at the doors of buses for counting the number of and logging the times that persons enter and leave the buses. This information may be used by the bus company for reconciling the number of passengers with the fares paid, and to verify whether the driver has charged the passengers the proper amounts for the distances over which each passenger traveled. The data may be used for many purposes including determining the volume of traffic entering and leaving the bus at each stop. The device may also be used in bus stations to count the number of people entering and leaving the station. In this way the number of people in the station at any given time is known so that bus scheduling may be arranged to minimize customer wait time in the terminal.

The device also may be used in connection with trains as with buses described above to determine the number of passengers that get on and off the train at each location. Such information may be used by the train company to insure that train capacity is sufficient to handle the number of people at each stop. The device provides means for reconciling the revenues with the number of passengers, and can be used in train stations as in bus stations described above.

The device may also be used to monitor traffic patterns (the flow of people) within airports. It can monitor the number and frequency of people entering and leaving a ticket line and determine the number of ticket agents required to minimize wait time. It may be used to monitor traffic within the airport at various locations for purposes of designing airport expansion and new airports to accommodate traffic flow.

There are numerous places where the device may be used to monitor traffic flow including banks, museums, libraries, government facilities, public buildings, theme parks, restaurants, manufacturing plants, and at specific locations within such facilities. It can be used in any application where it is important to obtain accurate information relating to the traffic flow of people or objects.

Another unique application for the present invention is as a security device. For example, security systems exist where coded cards are used to gain access to a secured area. A problem with such systems is the possibility for more than one person to gain access when a card is used. Visual monitoring systems are used, but these require that a guard continuously monitor the access. The device of the present invention may be used at the passageway to detect the number of persons entering the passageway. If more than one person enters, an appropriate alert may be generated. When used as a security device, the system of the present invention has the advantage of being self-monitoring. That is, the system continuously transmits and receives beams such that the signals are continuously generated indicating that the system is operational. The system measures a standard or reference condition, which may be the floor, when no person or object passes through a beam. This standard reference insures that the system is operating properly.

The system also may be used in applications for counting objects. It may be used with highways, bridges, or tunnels for counting the number of vehicles and for distinguishing the various types of vehicles, e.g., trucks from cars. It can measure the space between vehicles as well as determine the speed of each vehicle. The device may be used to monitor the traffic flow in each lane. The information is useful for traffic control, road and bridge maintenance, highway planning and construction, and traffic monitoring to give motorists alternate route information or route planning information. Its speed detection capability may be used to enforce speed limits.

The present invention may be used in manufacturing and industrial process control such as for monitoring the flow of objects on an assembly line and detecting the profile of the objects and thereby provide a means for determining a compliance with known profile criteria. For example, the device may be used to detect whether items on an assembly line are properly oriented for automated assembly.

Because the device is nonintrusive, and has no moving parts, it is uniquely suited to measure the height or depth of liquid or other material in a tank, and from that information determine the volume of material in a tank.

The above examples are merely illustrative of the many applications of the system of the present invention.

Generally, the system of the present invention comprises one or more optics modules or sensors located at one or more selected locations. The number of optics modules at each location depends on the width of the entrance or exit. The module is located above the passageway. Each optics module has means for emitting beams toward persons or objects moving past a selected location to generate reflected beams from those persons or objects. The included angle of the emitted and reflected beams is a function of the height of the person or object. The optics module further includes means for detecting the reflected beams and generating signals representative of the included angle, and thus the height of the person or object. The system further includes means for determining the speed and length of the person or object and generates signals representing a time-dependent height profile of the person or object as the person or object moves past the sensor. These signals are transmitted to a signal processor, and from there to a central processing unit (CPU), which processes the signals and generates data representing the number of persons or objects in preselected categories. The emitted and reflected beams are infrared, and the detector is a position sensitive detector which generates a signal in response to the position that the reflected beam strikes the detector which is indicative of the height of the person or object from which the reflected beam is reflected.

Where multiple optics modules are used at a given location, or where optics modules are used at several locations, the signals from the optics modules may be multiplexed and all processed by a single signal processor and CPU.

In one embodiment of the invention, each optics module or sensor generates at least two emitter beams which are generated alternately, and where the emitted beams are generated from different locations along the path of movement of the person or object. The reflected beam is detected at a location along the path of movement that lies between the locations from which the emitted beams are generated. In this way a single detector may be used for each optics module rather than a plurality of detectors, and yet the direction of travel of each person or object may be detected. In another embodiment two detectors are used and alternative pairings of the emitters and detectors are provided for maximum resolution.

In one embodiment of the invention, the CPU also receives data from a store POS system, and may receive data from other store computer systems as well, and generates information from the combined data to assist store management in evaluating store performance. Such information may be stored or displayed on a suitable display device such as a CRT or printer.

These and other features and advantages of the invention are apparent from the drawings and description to follow.

DETAILED DESCRIPTION OF A PREFERRED EMBODIMENT

Although the system of the present invention has many applications as explained above, this preferred embodiment will be described with particular reference to its store application.

Figure 1:
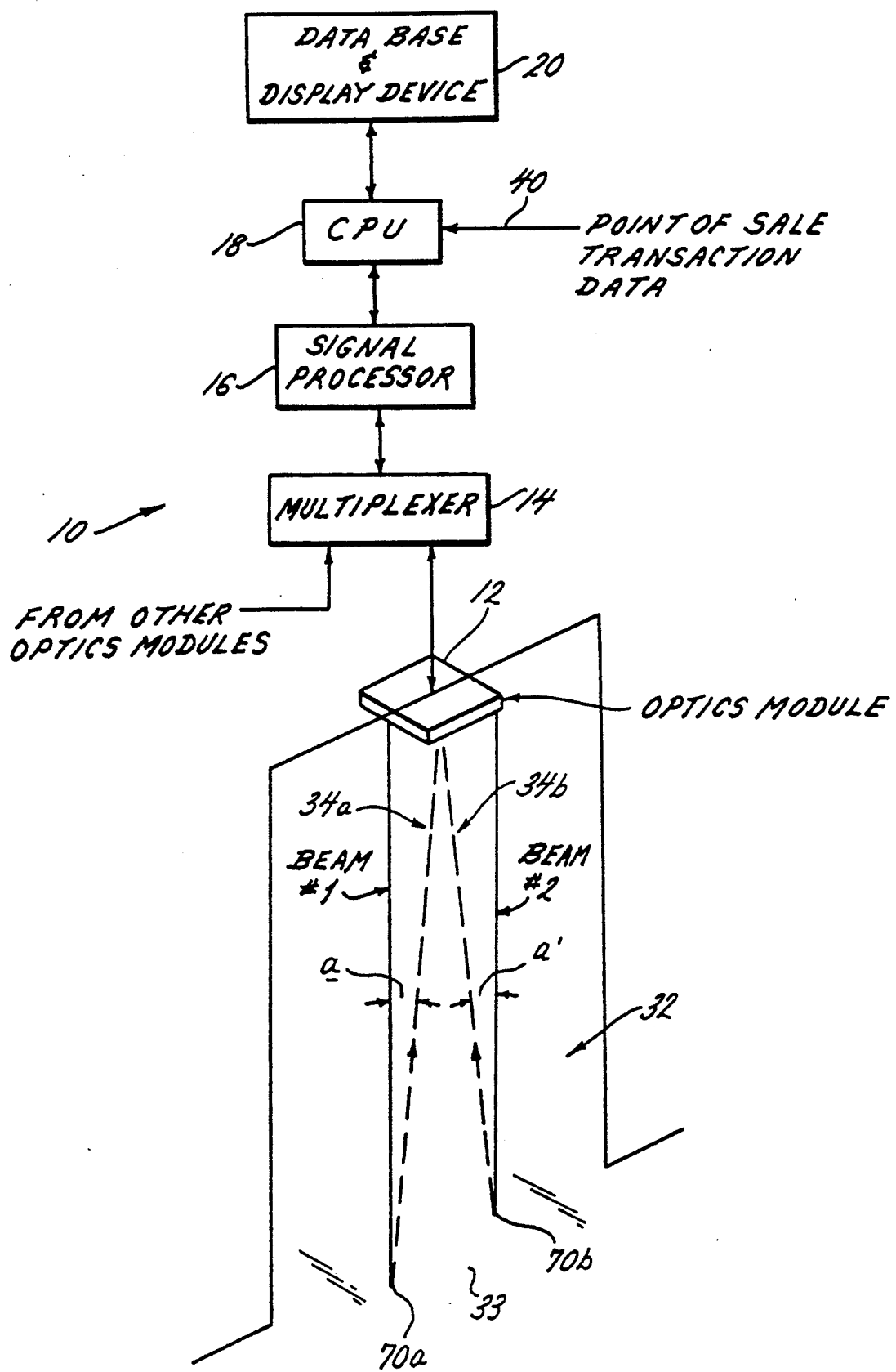
FIG. 1 is a schematic illustrating the system of the present invention, and illustrating a single sensor or optics module located at a doorway through which persons enter and exit.

With reference to FIG. 1 there is shown a system 10 of the present invention which comprises an optics module or sensor 12, a multiplexer 14, a signal processor 16, a CPU 18, and a database and display device 20. The optics module 12 is mounted so that it is located above the persons or objects entering or leaving the doorway 22 or other locations. Hence, it may be mounted in the ceiling, or on a suitable wall bracket that properly locates the module at the top of the doorway. The module may be mounted directly at the top or somewhat in front or behind the door so long as its beams are directed downwardly toward the persons or objects as they enter and exit through the doorway.

Figure 2:
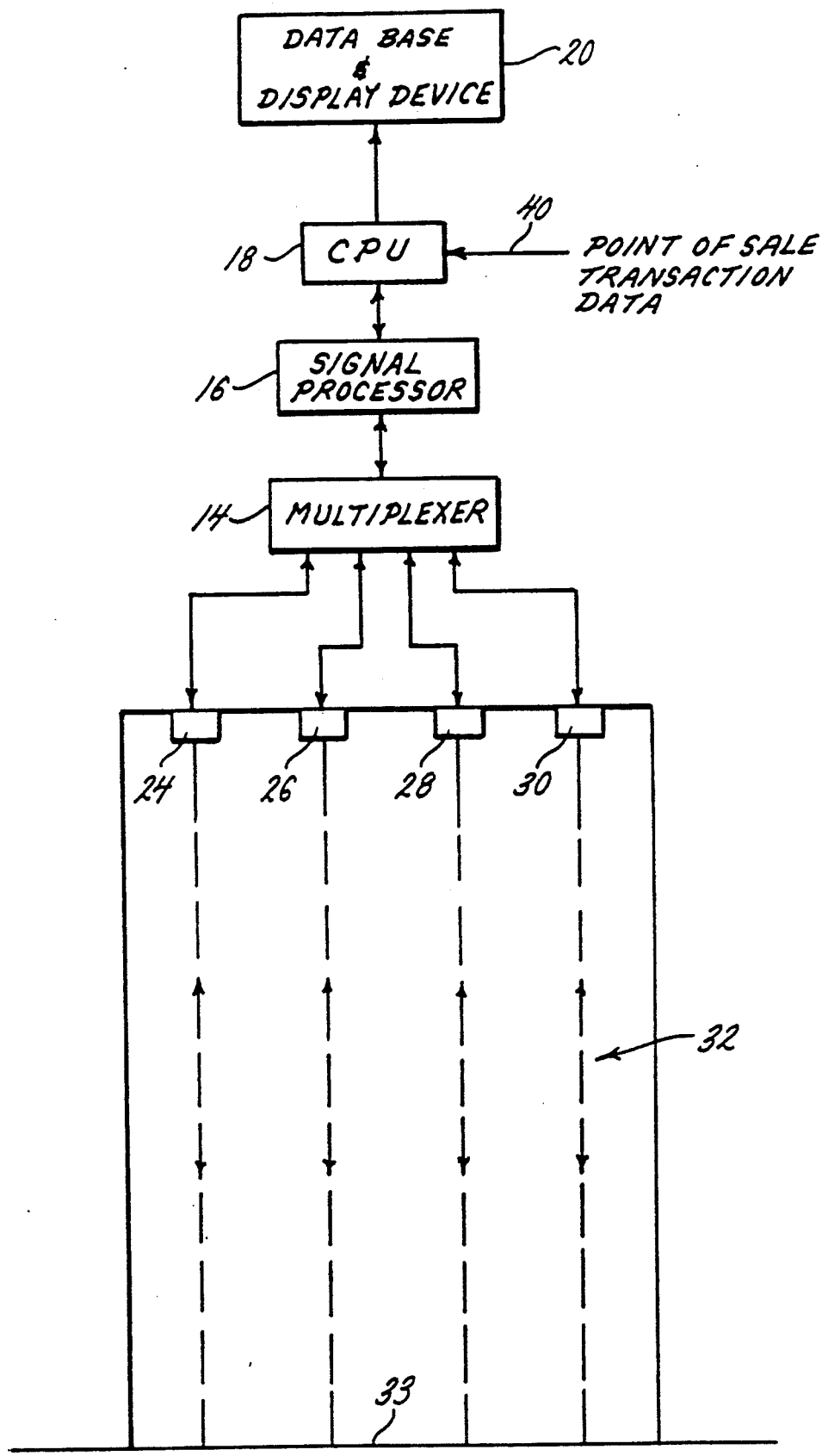
FIG. 2 is a schematic illustrating the invention and showing multiple optics modules in a doorway.

In FIG. 1 a single module is shown but multiple modules may be used as illustrated in FIG. 2. Where a doorway or other location is sufficiently wide that persons or objects entering or exiting through the doorway or passage may miss the beams, multiple modules are placed at selected intervals to insure that emitted beams strike each person or object entering or exiting through the passage. Hence, in FIG. 2 optics modules 24, 26, 28, and 30 are located across the width of a doorway 32. Each of the modules 28–30 operates in the same manner as the module 12 in FIG. 1 to emit beams and detect reflected beams as will be further explained.

The spacing between the modules 24–30 should be such as will insure that each person passing through the doorway is detected while minimizing the number of optics modules used. For example, a suitable spacing may be about 18 inches, although the spacing may be varied as appropriate. Furthermore, while four such modules are shown, it is to be understood that any number of modules may be used depending on the size of the passageway.

Returning now to FIG. 1, the optics module 12 preferably emits two infrared beams, No. 1 and No. 2. Upon each of these beams hitting an object, such as the floor 33, or a person or object entering or leaving through the doorway, a reflected beam 34 is generated. As will be more fully explained with reference to FIG. 3, the included angle a between beam No. 1 and its reflected beam 34, or the included a' between the beam No. 2 and its reflected beam 34, is indicative of the height of the person or object passing through the doorway. The taller the person or object that passes through the doorway, the greater will be the included angle a or a'. The optics module generates signals representative of the height of the person or object passing through the doorway, which signals are fed to the signal processor 16 by way of a multiplexer 14.

The purpose of the multiplexer 14 is to multiplex the signals from the optics module 12 with signals from other like optics modules that may be used at the same doorway or at other passageways. The signal processor 16 will be more fully described with reference to FIG. 4. Generally, signals are fed between the signal processor and the CPU 18. The CPU receives data from other store computers such as transaction data from the store POS system as indicated at 40. The CPU generates data from the signals from the signal processor representing the counts and heights of persons or objects entering and leaving through the passageway, and from the data generated by the other store computer systems for use by store management as heretofore explained. The data from the CPU is stored and displayed as indicated at 20.

Figure 3:
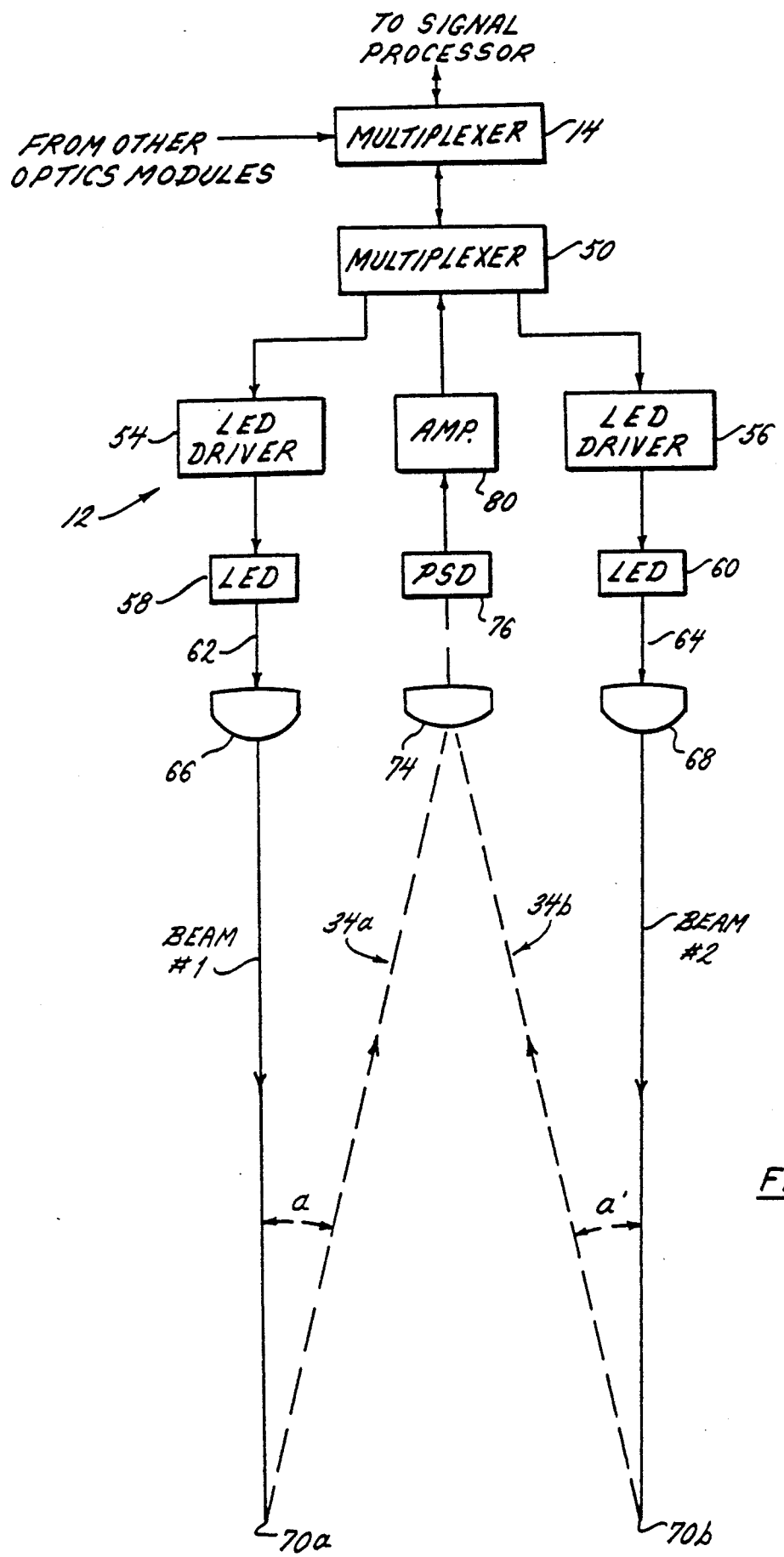
FIG. 3 is a schematic further illustrating an optics module or sensor in accordance with the present invention.

FIG. 3 illustrates a typical sensor or optics module which may be any of the modules 12 or 24–30. In a preferred embodiment of the invention each optics module includes a multiplexer 50 which multiplexes signals between the multiplexer 14 and the LED drivers and detectors. The multiplexer 14, in turn, multiplexes signals to and from the signal processor 16, so that in effect signals are multiplexed between the signal processor and the various LED drivers and detectors.

Figure 4:
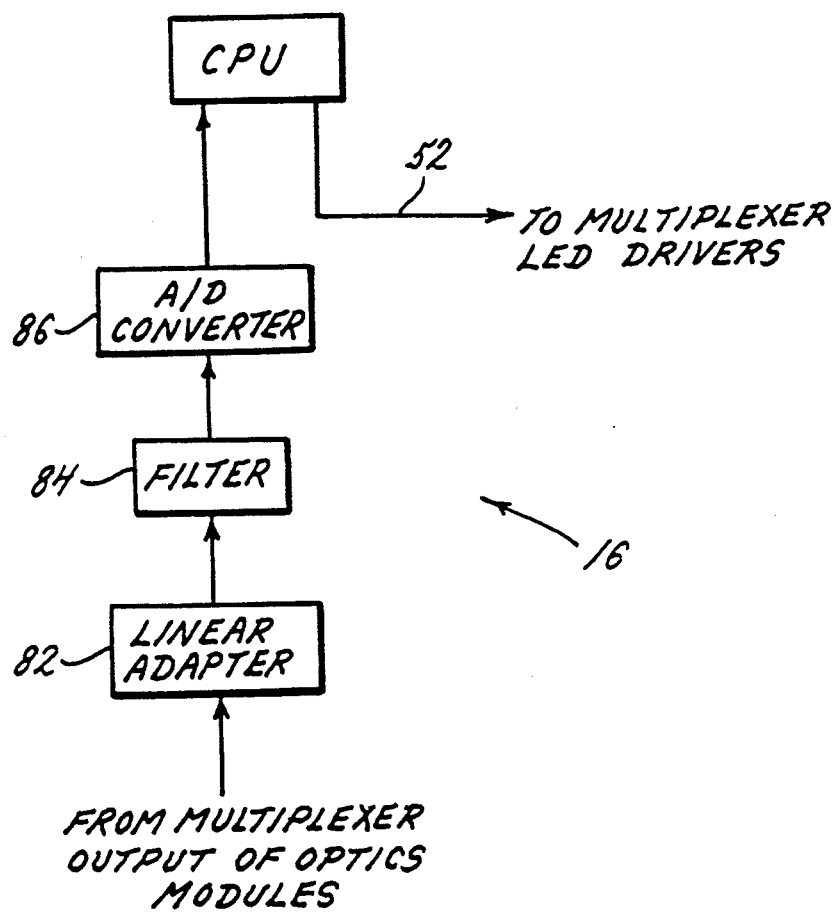
FIG. 4 is a schematic illustrating a signal processor used with the present invention.

Hence, by way of the multiplexers the signal processor receives signals from the CPU and transmits those signals as shown at 52 in FIG. 4 to a pair of infrared LED drivers 54 and 56 of the optics module. These drivers drive LED's 58 and 60, respectively, which emit infrared beams 62 and 64 through suitable lenses 66 and 68. The lenses 66 and 68 focus the beams, designated beam No. 1 and beam No. 2, at a selected location, such as locations 70a and 70b. For example, the locations 70a and 70b may be a distance of 12 feet from the lenses, although of course other distances could be used depending on the height of the doorway, ceiling, or the like. Locations 70a and 70b may be at the floor level.

When either beam No. 1 or beam No. 2 strikes the floor or locations 70a or 70b, a reflected infrared beam 34a, 34b is generated. The reflected beam passes through a lens 74 and impinges on a position sensitive detector (PSD) 76. The PSD is a device that generates a signal indicative of the position at which the reflected beam 34a, 34b strikes the PSD. Such a device has a detecting surface such that if the beam strikes the surface at a particular location, which may be a central location, the PSD generates at its output certain current levels. The current levels change depending on the distance away from center that the beam strikes the detecting surface. Hence, the current levels at the output of the PSD are indicative of the position at which the beam strikes the detecting surface of the PSD.

The output of the PSD is amplified at 80, and the amplified signal is fed by way of the multiplexers 50 and 14 to the signal processor 16. More specifically, with reference to FIG. 4, the amplified signal is fed to a linear adaptor 82. The amplified signal from the PSD is not linear. That is, the amplitude of the signal is not linearly proportional to the distance to the floor or location 70a or 70b. The purpose of the linear adaptor 82 is to linearize that signal.

The linearized signal from the linear adaptor 82 is fed to a filter 84 which filters out noise from other infrared sources. The output of the filter is fed to an analog-to-digital converter 86 that converts the analog signals from the PSD, as linearized and filtered, to digital signals that are fed to the CPU. The CPU is of a standard configuration including a microprocessor, bus, memory, driving controls, clock, and oscillator. The CPU is equipped with several types of communication ports so that it will accept data from the store's existing POS system. When a transaction occurs at a register in the store, that transaction is recorded, the record of that transaction is sent to the POS system, and from there is transmitted to the CPU 18. The data transmitted from the POS system on each transaction includes the time of day, the day of the week, the amount of the transaction, and the location in the store where the transaction occurred. That data is combined with the data from the signal processor 16 to provide the desired information for store management.

During the same time that the CPU receives digital signals from the converter 86, it also generates the necessary control signals to the drivers 54 and 56 to modulate the LED's 58 and 60 and generate beams No. 1 and No. 2.

Figure 5:
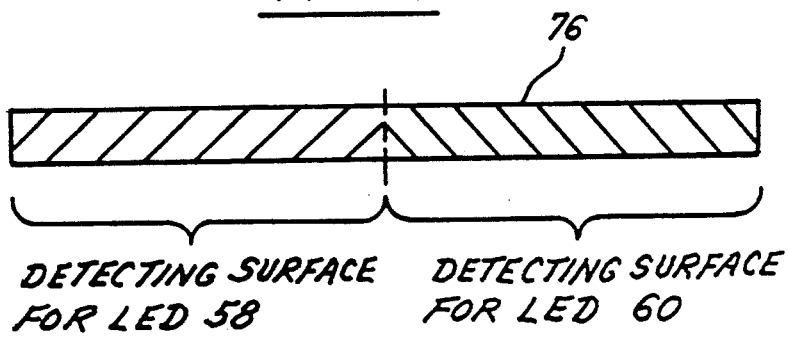
FIG. 5 is a diagram illustrating the operation of the position sensitive detector in accordance with one embodiment of the invention.

In accordance with one embodiment of the invention, beams No. 1 and No. 2 are not generated simultaneously. Instead, the generation of one is alternated with that of the other so that at any given instant of time only one such beam is generated and only one reflected beam 34a or 34b is detected at the PSD 76. Also, in accordance with this embodiment of the invention, each LED and its respective reflected beam uses a different half of the PSD. For example, the emitter 58 and its reflected beam 34a may use the left half of the detecting surface of the PSD 76, and the emitter 60 and its reflected beam 34b may use the right half. This is illustrated in FIG. 5. In other words, the reflected beams from the LED 58 strike the detecting surface of PSD 76 anywhere from the center to the far left, while the reflected beams from the LED 60 strike the detecting surface of PSD 76 anywhere from the center to the far right. The output current will be proportional to the distance from center that the reflected beam strikes.

Using this arrangement, a ranging distance from four to twelve feet from the lenses may be achieved. Only one PSD is needed, and only three lenses are needed with each optics module. The multiplexer 50 facilitates the alternate generation of the emitted beams which occurs at high speed. For example, each beam may be generated 40-80 times per second.

Beams No. 1 and No. 2 are emitted from spaced locations along the path of travel of persons or objects moving through the passageway. For illustration, FIG. 3 exaggerates the spacing between the lenses 66, 74, and 68 relative to the lengths of the beams.

Figure 6:
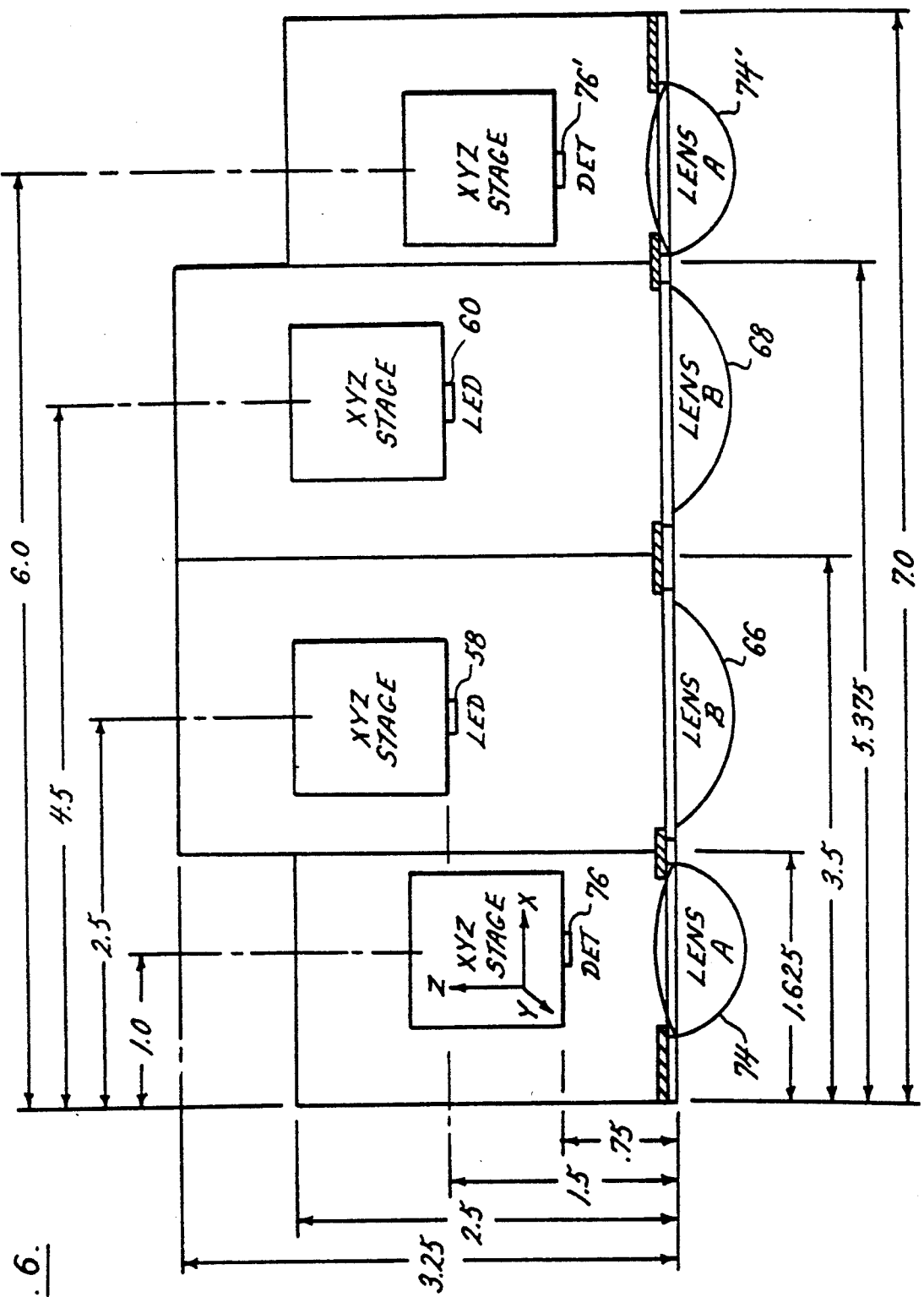
FIG. 6 is a diagram illustrating the mechanical arrangement for the sensor module of the present invention.

FIG. 6 illustrates another embodiment of the invention where each sensor or optics module includes two PSD's as well as two LED's. FIG. 6 is dimensioned to illustrate preferred sizes and spacings for the various LED's, PSD's, and lenses. The PSD's 76, 76' and the infrared LED's 58, 60 are available from Hamamatsu Corporation. The PSD's 76, 76' are identified as Hamamatsu Part #3274-14 and have about 140 killiohms interelectrode resistance, a sensitive area of about 1×3.5 mm, a light shield, and a spectral response range of about 760-1100 nm with a visible-cut epoxy package. The LED's are Hamamatsu Series L3458 with a radiant output power of about 13 mW, an emission angle of approximately 80°, and an effective emission area of approximately 0.7 mm. The PSD lenses 74, 74' are preferably aspheric lenses. An example is a lens from Rolyn Optics Company, Stock #17.1150 having a diameter of about 34 mm, an effective focal length of 24 mm, a back focal length of approximately 14.4 mm, a center thickness of about 14.0 mm, an edge thickness of about 1.8 mm, and a convex rear face. The lenses 66, 68 for the LED's may be from U.S. Precision Lens of Cincinnati, Ohio, and identified as Part #7799-00-001. It is a bi-convex aspheric lens with a back focal length of about 1.405 inches and an overall diameter of about 1.5 inches. The signal processor circuitry is also available from Hamamatsu Corporation, and may be Type #H2476-01.

Figure 7A:
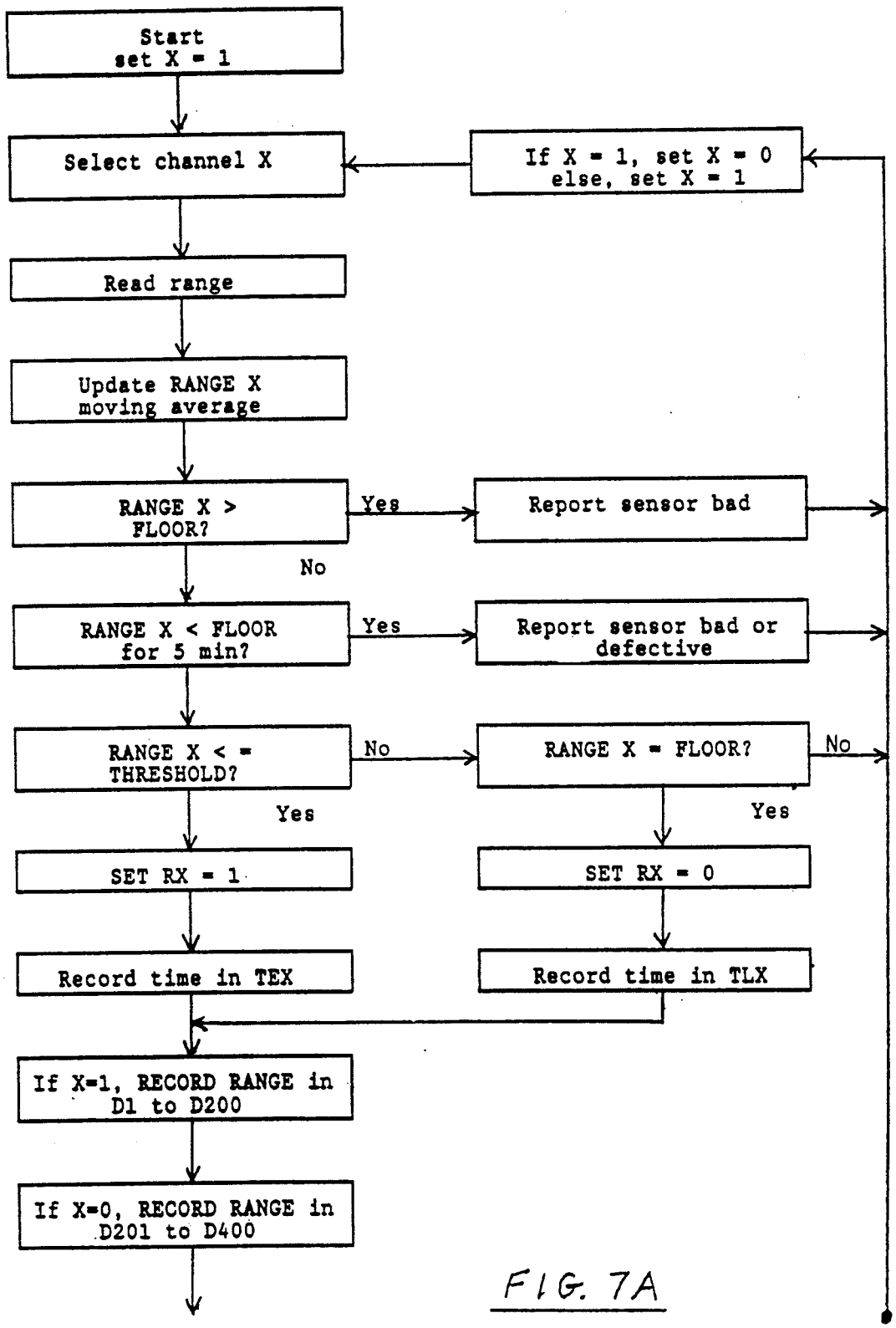
FIGS. 7a and b are a flow diagram of the system of the present invention.
Figure 7B:
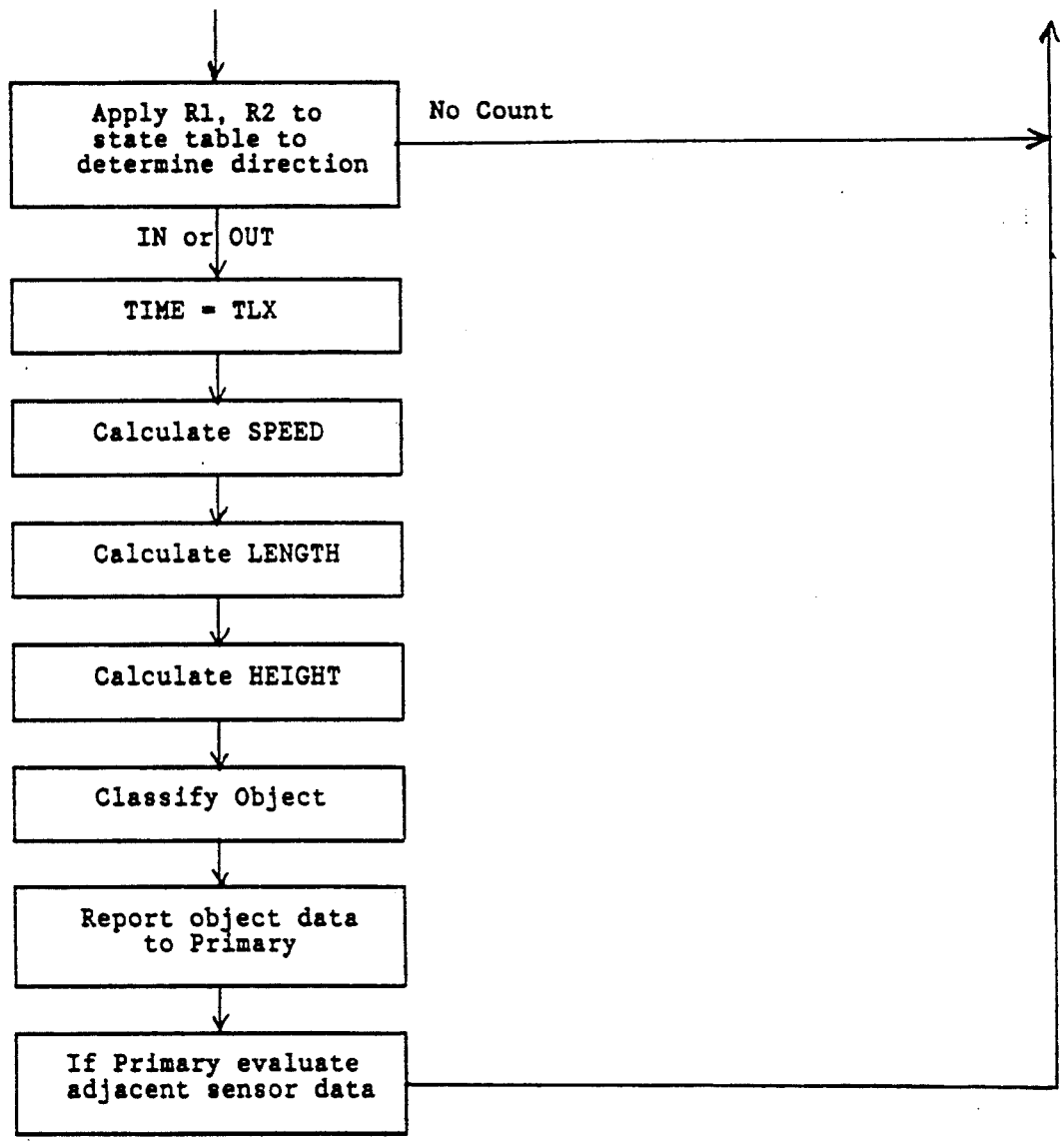

FIGS. 7a and 7b are a flow chart of the software of a preferred embodiment of the present invention. By way of explanation, the sensor 12 employs two channels, each containing an infrared emitter and detector. For example, with reference to FIG. 6, one channel may include emitter 58 and detector 76 and the other channel may include emitter 60 and detector 76'. Alternating between channels, the sensor fires one beam and then the other and reads corresponding range values from the detectors. The sensor reads each channel at the rate S, 40-80 samples per second, and computes moving averages, RANGE 1 and RANGE 2, of the last N samples, where $4 <= N <= 16$.

The sensor compares the new value of RANGE 1 or RANGE 2 to FLOOR, which is the distance from the sensor to the floor. Normally the sensor "sees" the floor, i.e., (RANGE 1, RANGE 2)=(FLOOR, FLOOR). If RANGE 1>FLOOR or RANGE 2>FLOOR, the sensor reports that it is defective. In this case the sensor has read a range below the floor, which is impossible. If RANGE 1<FLOOR or RANGE 2<FLOOR for five minutes, the sensor reports that it is either defective or blocked. For example, an object such as a box left under the sensor could cause this condition.

Object Detection and Data Collection

Next, the sensor compares the ranges to THRESHOLD, which lies 1 to 4 feet above the floor. If either range is closer than THRESHOLD, then an object is considered to be present. The sensor maintains two binary variables R1 and R2, which are used to mark the presence of the object under the beams. The sensor sets R1 and R2 and records time stamp data as follows: 3

| Event | Sensor Detection Criteria | Operation on State Table Input Variables | Time Recorded in Variable: |
| --- | --- | --- | --- |
| Object enters beam 1 | RANGE 1 <= THRESHOLD | Set R1 to 1 | TE1 |
| Object enters beam 2 | RANGE 2 <= THRESHOLD | Set R2 to 1 | TE2 |
| Object leaves beam 1 | RANGE 1 = FLOOR | Reset R1 to 0 | TL1 |
| Object leaves beam 2 | RANGE 2 = FLOOR | Reset R2 to 0 | TL2 |

The sensor increases stability by setting R1 and R2 at the THRESHOLD level and resetting them at the FLOOR level. These different levels provide hysteresis to R1 and R2. While R1=1, the sensor records all RANGE 1 values in the buffer D1 to D200. Similarly, while R2=1, the sensor records all RANGE 2 values as D201 to D400.

Object Direction Determination

Each time the sensor takes a new sample and recalculates R1 and R2, it tracks the object through the following state table to determine its direction. Transitions from the present state to the next state in the table depend on the values of R1 and R2. To record an IN the object must pass through states 0, 1, 2, 3, and back to 0. An OUT follows the path 0, 4, 5, 6, back to 0. The state table provides transition paths that allow an object to pass under the sensor part way and then back out without causing a miscount. An X in the table represents an input condition that cannot occur. R1 and R2 cannot change at the same time, because the sensor alternately samples one channel and then the other.

| | R1, R2 | | | |
| --- | --- | --- | --- | --- |
| | 0, 0 | 1, 0 | 1, 1 | 0, 1 |
| Present State | Next State, Count | | | |
| 0 (no object) | 0 | 1 | X | 4 |
| 1 (under beam 1 going in) | 0 | 1 | 2 | X |
| 2 (under both beams going in) | X | 1 | 2 | 3 |
| 3 (under beam 2 going in) | 0, IN | X | 2 | 3 |
| 4 (under beam 2 going out) | 0 | X | 5 | 4 |
| 5 (under both beams going out) | X | 6 | 5 | 4 |
| 6 (under beam 1 going out) | 0, OUT | 6 | 5 | X |

Object Time of Entry or Exit Determination

The sensor marks the TIME that the IN or OUT event occurs as follows:

| Event | Time Mark |
| --- | --- |
| IN | TIME = TL2 |
| OUT | TIME = TL1 |

Object Speed Calculation

From this information the speed of the person or object passing through the detector may be determined.

The time for the object's leading edge to pass under the two beams is TE2-TE1. The time for the trailing edge to pass under the beams is TL2-TL1. The beam SEPARATION divided by the average of these two times is object SPEED.

$$SPEED = SEPARATION/[(TE2-TE1)+(TL2-TL1)/2]$$

Object Length Calculation

From this information the length of the person or object may be determined.

The time that the object spends under beam 1 is TL1−TE1. Likewise, the time under beam 2 is TL2−TE2. The sensor averages these times and multiplies by the object's speed to find its LENGTH.

$$LENGTH = [(TL1-TE1)+(TL2-TE2)/2] \times SPEED$$

Object Height Calculation

The sensor picks the highest value in D1:D200 and the highest value in D201:D400. It averages these numbers to find object HEIGHT.

$$HEIGHT = [max (D1:D200) + max(D201:D400)]/2$$

The system classifies objects by height, speed, and length as follows:

| Object Classification | HEIGHT (feet) | SPEED (feet/sec) | LENGTH (inches) |
|---|---|---|---|
| Child | $>= 2$ and $< 4$ | $<= 3$ | $> 6$ and $< 12$ |
| Adult | $>= 4$ and $<= 7$ | $<= 3$ | $> 8$ and $<= 24$ |
| Vehicle | X | X | $> 24$ |
| Unknown | $> 7$ | X | X |

Adjacent Sensor Object Evaluation

Sensors are spaced overhead at a typical interval of 18 inches. Any object passing under two adjacent sensors must not be counted twice. On the other hand, two separate objects entering or exiting at the same time under two adjacent sensors must be counted. In either case, the two sensors will each report a detected object back to the Primary unit, which will make the final determination to count once or twice according to the following criteria:

| Count | Direction | HEIGHT (feet) | SPEED (ft/sec) | LENGTH (inches) | TIME (sec) |
|---|---|---|---|---|---|
| 1 | same | within 1 | within .050 | within 4 | within .030 |
| 2 | | any other values | | | |

Figure 8:
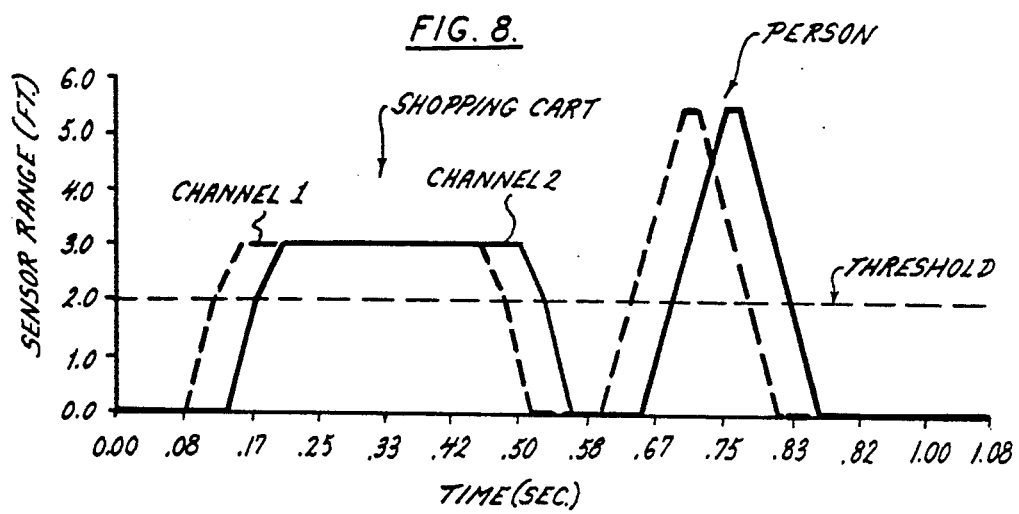
FIG. 8 is a diagram illustrating the operation of the system of the present invention where a person pushing a shopping cart moves past the sensor module.

FIG. 8 is a graph that illustrates the operation of the system where a person approximately 5.5 feet tall pushing a shopping cart approximately 3 feet high moves past the detector at a rate of approximately 3 miles per hour. In this example, the threshold is set at 2 feet. In accordance with the criteria described above, the person would be counted by the system as an adult because the person is greater than or equal to 4 feet and less than or equal to 7 feet tall, is moving at a speed less than or equal to 3 feet per second, and has a length greater than 8 inches and less than or equal to 24 inches. The person does not meet all the criteria to be classified as a child, a vehicle or unknown. The shopping cart would be counted as a vehicle as it meets that criteria, and does not meet all of the criteria for any other classification.

It will be noted from FIG. 8 that the system generates signals representing a time-dependent height profile of the person or object as the person or object moves past the sensor. As explained above, the magnitude and timing of those signals determine the height, speed, and length criteria for classifying the person or object in accordance with selected criteria These criteria are by way of example only, and it should be understood that other criteria may be established for the system within the scope of this invention.

Figure 9:
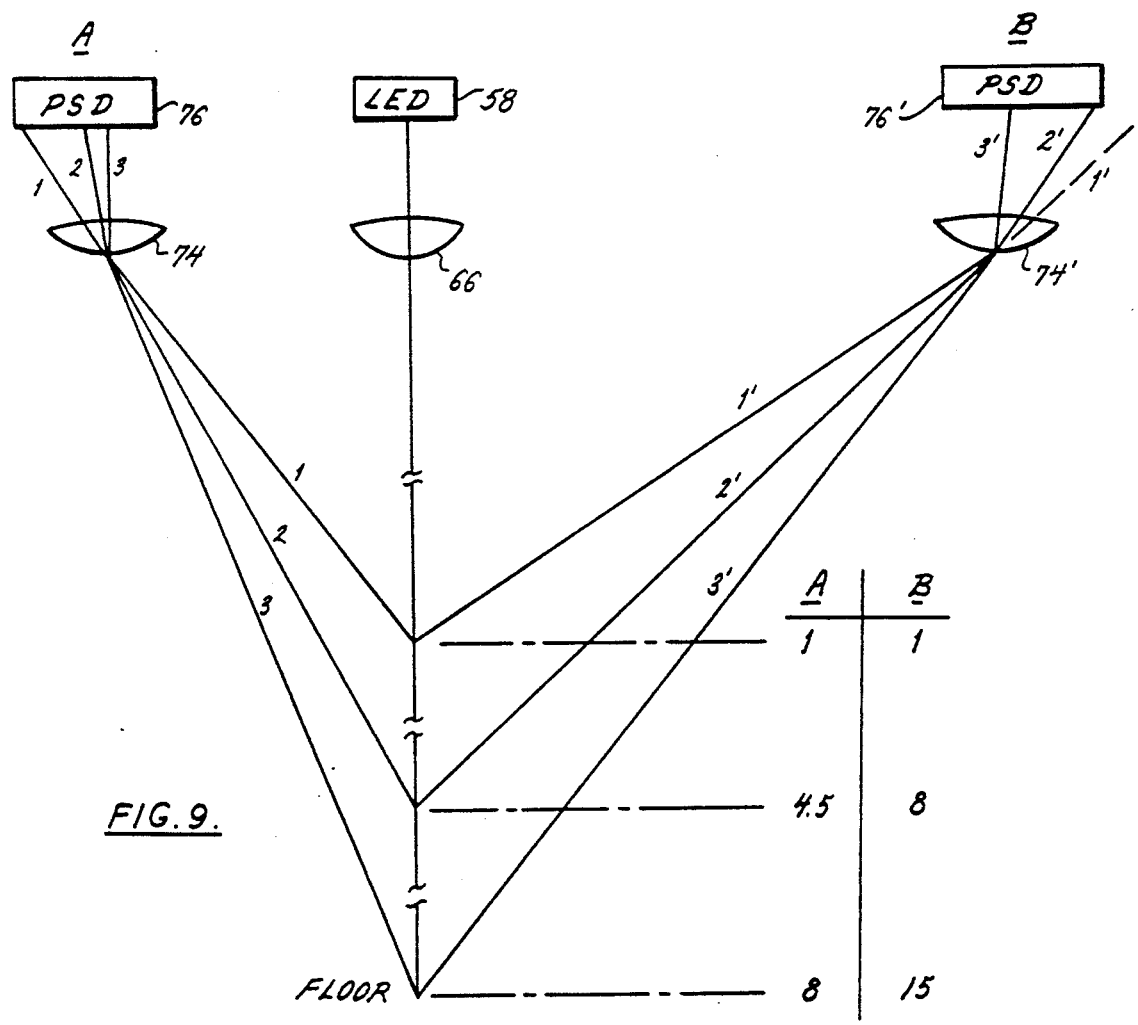
FIG. 9 is a diagram illustrating alternate pairings of the emitters and detectors of the sensor module.

With reference particularly to FIGS. 6 and 9, the system of the invention will pair the emitters and detectors to provide maximum resolution for the distance above the floor at which the sensor is mounted. Depending on the height mounting condition, either emitter 58 is paired with detector 76 and emitter 60 is paired with detector 76', or emitter 58 is paired with detector 76' and emitter 60 is paired with detector 76. The first pairing will be referred to as condition A and the second pairing as condition B.

Referring to FIG. 9, these two conditions are illustrated. Condition A assumes that the sensor is mounted 8 feet above the floor and that the height of all persons or objects 7 feet or less are measured. Under such conditions, the first pairing is used. FIG. 9 illustrates that with condition A the emitter 58 is paired with detector 76 so that the full 7-foot range is detected. With condition B, it is assumed that the sensor is 15 feet above the floor, and as with condition A only persons or objects 7 feet or less in height are to be measured. This means that the first 8 feet below the sensor may be ignored. If with condition B the pairing were the same as with condition A, the spread of the reflected beams 1, 2, and 3 impinging upon the detector 76 would be substantially less than the spread shown with condition A. This would decrease the resolution. So instead the pairing of condition B is used so that the spread of reflected beams 2' and 3' is substantially greater on detector 76' for greater resolution.

It has been found preferred that the distance between the emitter 58 and detector 76, and also between the emitter 60 and detector 76', be approximately 1.5 inches so that the reflected beam moves a distance on the detector of approximate 1.5 mm as the distance that the emitted beam strikes the person or object moving past the sensor varies from approximately 2 to 15 feet.

It has been found that the above sensor design criteria, including those of FIG. 6, are beneficial in achieving optimum performance, efficiency, and cost. With these parameters the emitted and reflected beams have light images that are evenly projected without haloes. The projected and reflected light images (spots) are small so that the detectors can distinguish one position from another with high resolution. It has been found that the projected spots from the beams should be 2 to 5 inches in diameter at distances of approximately 2 to 15 feet from the emitted beam to the person or object. The reflected spot impinging upon the detector should be between 0.2 to 0.5 mm in diameter. The reflected spots should be sharp with high contrast as with the projected spot. The use of aspheric lenses help achieve these desired conditions. The circumferences of the two projected spots from the emitters 58, 60 should be separated by approximately 1 to 8 inches. If the spots are too close a person or object moving past the sensor would not leave one spot before entering the other. If the spacing between the spots is too great, both may not be intercepted by a person or object moving past the detector at the same time.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A system for automatically recognizing persons or objects as they move past a selected location and for classifying said persons or objects in accordance with selected criteria, said system comprising:
   means for emitting beams toward a person or object moving past a selected location to generate reflected beams from said person or object intercepting said beams, the included angle of an emitted and reflected beam being a function of the height of the person or object;
   means for detecting said reflected beams and generating signals representative of the included angles and thus the height of the person or object;
   means for determining the speed and length of the person or object intercepting said emitted beams;
   means for generating signals representing a time dependent height profile of the person or object from which the beams are reflected; and
   means for classifying said person or object in accordance with selected criteria.

2. The system of claim 1 wherein said beams are infrared beams, and said detecting means further comprises a position sensitive detector.

3. The system of claim 1, wherein said location has at least one optics module, said module further comprising at least one infrared light emitting diode and corresponding lens for generating and directing at least one infrared beam from a location toward the person or object as the person or object moves past said location, and at least one infrared beam position sensitive detector for detecting a reflected beam generated upon an emitted beam striking a person or object, said position sensitive detector generating a signal in response to the position that the reflected beam strikes the detector which is indicative of the height of the person or object from which the reflected beam is reflected.

4. The system of claim 4 wherein said location has multiple optics modules spaced at selected intervals.

5. The system of claim 3 wherein said optics module has at least two infrared light emitting diodes and corresponding lenses for generating and directing at least two infrared beams from a location toward the person or object as the person or object moves past said location, the generation of the emitted beams being alternate, and wherein said emitted beams are generated from different locations along the path of movement of said person or object.

6. The system of claim 5 wherein said optics module further includes at least two position sensitive detectors, said system further comprising means for selectively pairing the emitting diodes and detectors for optimum resolution depending on the distance range over which the system must operate.

7. The system of claim 6 wherein said reflected beam is detected at a location along the path of movement that lies outside the locations from which the emitted beams are generated.

8. The system of claim 3 further comprising means for detecting the direction that each person or object travels along the path of movement, said means being responsive to the sequence in which the emitted beams strike a person or object as the person or object moves along the path.

9. The system of claim 1 wherein said criteria includes criteria relating to the height, speed, and length of the person or object.

10. A system for automatically recognizing persons or objects as they move past a selected location and for classifying said persons or objects in accordance with selected criteria, said system comprising:
    means for emitting at least two beams toward a person or object moving past a selected location to generate reflected beams from said person or object, the included angles of the emitted and reflected beams being a function of the height of the person or object, said emitted beams being generated from different locations along the path of movement of said person or object such that as the person or object moves past said location, the person or object first intercepts one emitted beam and then the other;
    means for detecting said reflected beams and generating signals representative of the included angles and thus the height of the person or object;
    means for determining the speed of the person or object intercepting said emitted beams; and
    means for classifying said person or object in accordance with selected criteria.

11. The system of claim 10 further comprising means for determining the length of the person or object intercepting said emitted beams.

12. The system of claim 11 wherein said means for determining the speed of the person or object is a function of the separation of the beams and the time traveled by the person or object from one beam to the next, and wherein said means for determining the length of the person or object is responsive to the speed of the person or object and the time that the person or object is under a beam.

13. The system of claim 12 wherein said beams are infrared beams, and said detecting means further comprises a position sensitive detector, said position sensitive detector generating a signal in response to the position that the reflected beam strikes the detector which is indicative of the height of the person or object from which the reflected beam is reflected.

14. The system of claim 13 further comprising means for detecting the direction that each person or object travels along the path of movement, said means being responsive to the sequence in which the emitted beams strike a person or object as the person or object moves along the path.

15. The system of claim 14 wherein said criteria includes criteria relating to the height, speed, and length of the person or object.

16. The system of claim 11 wherein said selected criteria include criteria relating to the height, speed, and length of the person or object intercepting said emitted beams.

17. The system of claim 10 wherein the emission and detection of said emitted and reflected beams are at sufficiently high frequencies to generate signals representing a time depending height profile of the person or object.

18. The system of claim 17 wherein said beams are infrared beams, and said detecting means further comprises a position sensitive detector.

19. The system of claim 18 further comprising means for detecting the direction that each person or object travels along the path of movement, said means being responsive to the sequence in which the emitted beams strike a person or object as the person or object moves along the path.

20. The system of claim 10 wherein said means for determining the speed of the person or object is a function of the separation of the beams and the time traveled by the person or object from one beam to the next.

21. A method for automatically recognizing persons or objects as they move past a selected location and for classifying said persons or objects in accordance with selected criteria, said method comprising the steps of:

emitting beams toward a person or object moving past the selected location to generate reflected beams from said person or object intercepting said beams, the included angles of the emitted and reflected beams being a function of the height of the person or object;

detecting said reflected beams and generating signals representative of the included angle and thus the height of the person or object;

determining the speed and length of the person or object intercepting said emitted beams;

generating signals representing a time-dependent height profile of the person or object from which the beams are reflected; and classifying said person or object in accordance with selected criteria.

22. The method of claim 22 wherein said beams are infrared beams, and further comprising a position sensitive detector, said method further comprising generating signals in response to the positions that the reflected beams strike the detector.

23. The method of claim 21 further comprising the step of detecting the direction that each person or object travels along the path of movement.

24. The method of claim 21 wherein said classifying step further comprises classifying said person or object in accordance with criteria relating to the height, speed, and length of the person or object.

25. A method for automatically recognizing persons or objects as they move past a selected location and for classifying said persons or objects in accordance with selected criteria, said method comprising the steps of:

emitting at least two beams toward a person or object moving past a selected location to generate reflected beams from said person or object, the included angles of the emitted and reflected beams being a function of the height of the person or object, said emitted beams being generated from different locations along the path of movement of said person or object such that as the person or object moves past said location, the person or object first intercepts one emitted beam and then the other;

detecting said reflected beams and generating signals representative of the included angles and thus the height of the person or object;

measuring the speed of the person or object intercepting said emitted beams; and classifying said person or object in accordance with selected criteria.

26. The method of claim 25 further comprising the step of measuring the length of the person or object intercepting said emitted beams.

27. The method of claim 26 wherein said speed of the person or object is measured as a function of the separation of the beams and the time traveled by the person or object from one beam to the next, and the length of the person or object is measured in response to the speed of the person or object and the time that the person or object is under a beam.

28. The method of claim 28 wherein said classifying step further comprises classifying said person or object in accordance with criteria relating to the height, speed, and length of the person or object intercepting said emitted beams.

29. The method of claim 25 further comprising emitting and detecting said emitted and detected beams at sufficiently high frequencies to generate signals representing a time-dependent height profile of the person or object.

30. The method of claim 29 wherein said beams are infrared beams, and said detecting means further comprises a position sensitive detector.

31. The method of claim 30 further comprising detecting the direction that each person or object travels along the path of movement in response to the sequence in which the emitted beams strike a person or object as the person or object moves along the path.

32. The method of claim 25 wherein said speed of the person or object is measured as a function of the separation of the beams and the time traveled by the person or object from one beam to the next.

* * * * *